United States Patent
Ellert et al.

[11] 3,732,425
[45] May 8, 1973

[54] LIGHT CONDUIT WITH DOUBLE CLADDING

[75] Inventors: Frederick J. Ellert, Broomall; Bernard D. Leete, Newtown Square, both of Pa.

[73] Assignee: General Electric Company, Philadelphia, Pa.

[22] Filed: Dec. 18, 1970

[21] Appl. No.: 99,621

[52] U.S. Cl. .................. 250/217 S, 250/227, 350/96
[51] Int. Cl. ........................... G02b 5/14, H01j 39/12
[58] Field of Search ..................... 250/217 S, 227; 324/96; 252/519

[56] References Cited

UNITED STATES PATENTS

| | | | |
|---|---|---|---|
| 3,258,434 | 6/1966 | Mackenzie et al. | 252/519 |
| 3,541,341 | 11/1970 | Leete | 250/227 |
| 3,222,520 | 12/1965 | McNaney | 250/227 X |
| 3,485,940 | 12/1969 | Perry et al. | 324/96 X |

Primary Examiner—James W. Lawrence
Assistant Examiner—T. N. Grigsby
Attorney—J. Wesley Haubner, Albert S. Richardson, Jr., Frank L. Neuhauser, Oscar B. Waddell and Joseph B. Forman

[57] ABSTRACT

An optical fiber is provided with an extra outer layer or cladding of a material which is chemically stable and protects the less stable inner optical glass from the adverse effects of moisture or chemicals in the environment when the material is an electronically conducting glass and both ends of the fiber are at substantially different electrical potentials, current in the outer cladding supports resistance heating to prevent the accumulation of moisture. The conductivity of the glass prevents the formation of localized high potential gradients. The fiber is particularly useful in providing a light link between two electrical circuits which are at substantially different electrical potentials.

7 Claims, 3 Drawing Figures

INVENTORS:
FREDERICK J. ELLERT,
BERNARD D. LEETE,
BY Albert S. Richardson Jr.
ATTORNEY

LIGHT CONDUIT WITH DOUBLE CLADDING

BACKGROUND OF THE INVENTION

The present invention relates generally to light-transmitting fibers or conduits, and more particularly it relates to such conduits which are useful to transmit light signals between two physically spaced-apart regions at significantly different electric potentials.

It is sometimes desirable to provide a communication link between areas or regions of greatly differing electric potentials, which link maintains electrical isolation between such regions. One example of such a situation is found in high-voltage solid-state electric valves wherein gate pulse forming circuits at very high potentials are activated by remotely located control means whose potential is much lower.

One means for providing a communication link is known as a light guide or pipe which usually comprises a plurality of parallel optical fibers or light conduits inside a flexible, opaque jacket. Such light pipes may be used to transmit light pulses, which are generated, on command, by a source of light at ground potential, to a plurality of gating current signal deriving circuits respectively associated with a plurality of thyristors which are serially interconnected to form a high-voltage valve, as disclosed in U.S. Pat. No. 3,355,600-Mapham, assigned to the General Electric Company.

The light transmittance of an optical fiber depends upon the phenomenon of internal reflection; whereby light impinging from within the fiber upon the interface between a transparent cylindrical "core" having a higher index of refraction than a transparent cladding disposed about the core, and at grazing angles smaller than the critical angle for the fiber materials, is reflected along the length of the fiber. The term "light" is used herein in a general categorical manner to denote radiant energy, and it is intended to comprehend invisible as well as visible radiation. For example, ultra violet and infrared radiation are intended to be included within this term.

Although a variety of light guides are known and commercially available in the trade, heretofore none has been entirely satisfactory for very high voltage apparatus of the kind presently contemplated. In such applications there is a premium on long life and reliability, yet the light guide is subjected to a relatively harsh environment. The high voltage drop between its opposite ends and the moisture and other deleterious chemicals that may be present in the ambient atmosphere tend to degrade or to impair the light transmitting properties of the guide and to accelerate its ageing.

It is therefore a general objective of this invention to provide an improved light conduit whose operation is relatively immune to moisture in the presence of a substantial potential gradient.

It is a further object of this invention to provide a light conduit having improved resistance to abrasion and other physical or chemical damage.

SUMMARY OF THE INVENTION

Briefly stated, in accordance with the present invention, a special cladding is applied to the exterior of an otherwise conventional optical fiber. The material of this extra cladding is selected to have a higher degree of chemical stability than is available in the optical materials of the fiber which it encloses, thereby protecting the fiber from damage by moisture or chemicals. In one aspect of the invention, the extra cladding comprises electronically conducting glass which ensures a relatively uniform potential gradient along the full length of the fiber between its opposite ends which are respectively subjected to significantly different potentials. This eliminates injurious corona discharge and sparking that otherwise might result at points of critically high voltage concentration if the potential distribution were not uniform, and it minimizes the fiber length required for safe operation in a high voltage environment. Furthermore, the electroconductive properties of the extra cladding contribute to a resistance heating effect which keeps the fiber surface dry.

BRIEF DESCRIPTION OF THE DRAWING

The invention will be better understood and its various objects and advantages will be more fully appreciated from the following description taken in conjunction with the accompanying drawing in which.

DESCRIPTION OF THE INVENTION

Figure 1:
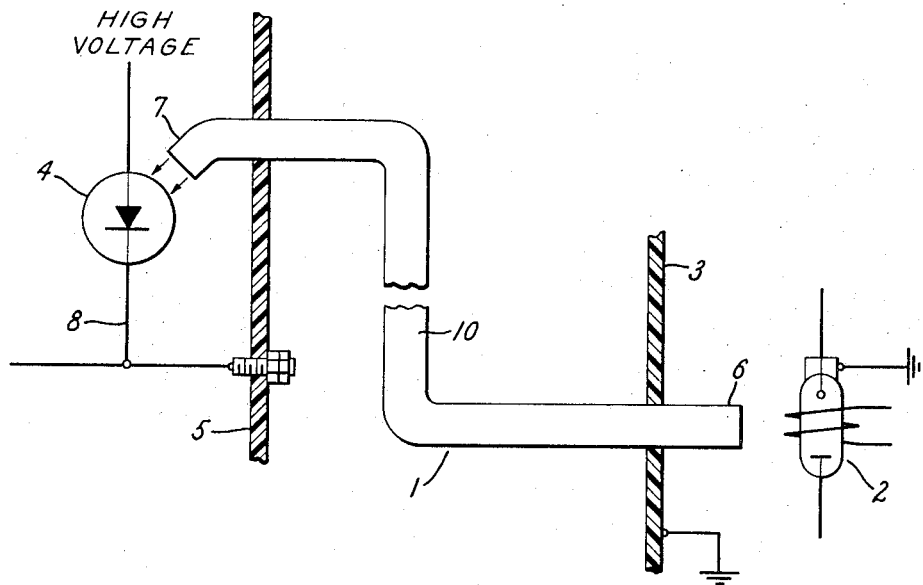
FIG. 1 is a diagrammatical representation of a light transmission system comprising a source of light, a light sensitive element, and a light pipe connected therebetween.

Referring now to FIG. 1, a light transmission path is provided by an electromagnetic wave guide 1 (hereinafter called "light pipe") extending from a source of light 2, which is behind an enclosure 3, to a light sensitive element 4 located within an insulated enclosure 5. The enclosures 3 and 5 may be physically separate and distinct from each other, or alternatively they may comprise remote parts of a common housing. The purpose of the light pipe 1 is to transmit light signals an appreciable distance from the source 2 to the element 4. The source 2 comprises a gallium arsenide light emitting diode or a Xenon flash lamp or the like, and when activated by a suitable control signal it will emit light which enters the adjoining end 6 of the pipe 1. This light exits from the opposite end 7 of the pipe where it illuminates the element 4. The element 4 comprises a photodetector or a light-activated SCR or the like, and when the light from the pipe 1 impinges thereon it will abruptly switch from a normally high-resistance blocking state to a low-resistance current-conducting state, thereby controlling conduction by an electric circuit 8 in which the element 4 is connected.

Although not shown in FIG. 1, the input and output ends of the light pipe 1 can be terminated by connector plugs and mating receptacles such as those disclosed and claimed in U.S. Pat. No. 3,541,341 granted to B.D. Leete on Nov. 17, 1970 and assigned to the assignee of the present invention. In this manner the ends 6 and 7 of the light pipe 1 are fastened in intimate physical relationship to the enclosures 3 and 5, respectively. Typically the light source 2 and its enclosure 3 are maintained at or near ground potential, and the circuit 8 in which the light-activated element 4 is connected can have an electrical potential substantially different than ground (e.g., plus or minus 20,000 volts or more). Such a condition exists where the element 4 is part of the gating or power circuit of a high-voltage solid-state electric valve comprising a plurality of parallel arrays of thyristors in series. Actually in this particular setting a plurality of light-activated elements can be disposed at various potentials with respect to the common light source, and some of the near by elements may have potentials relatively close to that of the source. The light source 2 itself, instead of being grounded as shown, may alternatively be at a significantly elevated potential. In any event, it is assumed herein that due to the potential difference between the illustrated circuit 8 and the enclosure 3, a substantial potential difference can be established across the light pipe 1 which is interposed between regions respectively adjacent the source 2 and the element 4. The light pipe may extend for a distance of the order of 30 feet, for example.

Figure 2:
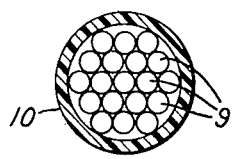
FIG. 2 is a cross sectional view of the light pipe shown in FIG. 1.

The illustrated light pipe 1 comprises one or more optical fibers 9. As is best seen in FIG. 2, a plurality of these optical fibers are bundled randomly in an opaque polyethelene sheath or jacket 10 to form the light pipe. The term "optic" as used herein is not intended to imply only visible light. Optical fibers for either visible or invisible light are well known in the art and may be made of glass or suitable plastic. We prefer to use glass fibers. Each fiber comprises a transparent inner member or core 12 clad with a transparent material 13 of lower refractive index than the core material so that light travels in a zig-zag path through the core of each fiber by internal reflections from the cladding. The amount of light transmitted through the pipe 1 is a function of the number and the core area of constituent fibers, the intensity of the light source, and the loss characteristics of the light pipe. Typical diameters of individual fibers 9 are 1.5 to 2.5 mils, and the bundle may have a diameter of approximately 125 mils, for example.

Light pipes are normally made of materials having high resistance properties, whereby current leakage between regions of differing potential is minor. Nevertheless, in the contemplated unidirectional high-voltage application the performance of an initially satisfactory light pipe may in time become unsatisfactory due to certain deteriorating effects which can result in loss of ability to withstand a large potential gradient or loss of light-transmitting qualities or both. This problem becomes acute when the light pipe is exposed to a damp or humid atmosphere. It is believed that such dampness causes harmful effects in a number of ways, and the relatively large surface area of a bundle of small glass fibers aggravates these effects. One effect of dampness is to accelerate electrolysis and other electrochemical reactions resulting in permanent chemical changes within the fiber affecting its optical properties and mechanical strength. Even in the absence of potential gradient, there may be corrosion or erosion effects on the fiber surface which create cracks and loss of mechanical strength. It will be recognized that loss of strength may result in fiber breakage and partial or complete loss of light transmission, depending on the percentage of fibers affected in a given bundle. Another effect of dampness is to increase the surface conductivity of the fibers. When this occurs in a non-uniform manner throughout the length of a light pipe having a large potential difference between its opposite ends, regions of very high potential gradient may be created. When the gradient becomes high enough (e.g., more than 30 volts per mil) corona discharge results, thereby destroying the light pipe after a period of time or sooner, if complete electrical breakdown and arcing occurs.

In accordance with our invention, such discharge is prevented by applying an extra outer cladding of electronically-conducting transparent glass to the previously described optical fibers. Such cladding is shown at 14 in FIG. 3. It has two principal functions: first, by providing a somewhat lower degree of uniform bulk resistivity in parallel with the surface resistivity of the first cladding 13, variations in surface resistivity are swamped out and the desired uniform potential gradient is maintained; secondly, the current flow thus constituted produces a resistance heating effect, keeping air near the fiber surface at a lower relative humidity than the surrounding atmosphere and preventing moisture condensation on the surface. Thus we avoid or minimize the various problems summarized hereinbefore, and in addition we minimize the length of a light pipe required to withstand a given high voltage between its opposite ends without exceeding a safe voltage concentration at any local region therebetween.

Electronically-conducting glass herein defined as glass in which electronic conduction predominates over ionic conduction. In a preferred form, the ratio of electronic to ionic conduction should exceed 100:1 (and may advantageously approximate 1,000:1) in order to prevent the creation of localized zones of differing potential caused by ion migration, and to prevent such variance in magnitude of the electric potential of said zones that the gradient therebetween will cause an electrical discharge. One such type of glass considered suitable for use in the instant invention is that disclosed in U.S. Pat. No. 3,258,434 MacKenzie et al., assigned to the General Electric Company.

The glass described in the MacKenzie et al. patent provides the requisite electronic conduction along with the desired resistive characteristics. The glass consists essentially of boron oxide and between 20 and 40 mole percent of a glass network modifier selected from a group consisting of calcium oxide, barium oxide, magnesium oxide, and strontium oxide, and at least 15 mole percent of an oxide of a multivalent metal selected from the group consisting of chromium, iron, antimony, vanadium, titanium, nickel, cobalt, manganese, molybdenum, tungsten, and arsenic and mixtures thereof. This borate glass may have a room temperature electrical resistivity of from $10^4$ to $10^{12}$ ohm-cm, and the oxide of the multivalent metal provides in the glass metal ions of higher valence state and metal ions of lower valence state in the ratio to each other of from equal parts to four parts to one part.

Figure 3:
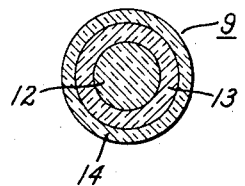
FIG. 3 is a cross sectional view of one of the optical fibers comprising the light pipe shown in FIG. 2.

As is indicated in FIG. 3, our outer cladding 14 of electronically-conducting glass is preferably applied to each of the individual fibers 9 in the light pipe 1. Alternatively, a plurality of conventional fibers could be covered by a single tubular sheath of electronically-conducting glass or conducting flexible plastic tubing. In either case, the extra cladding or sheath surrounds the first cladding of the optical fibers and sustains a more uniform potential gradient, thereby preventing electric discharge and sparking upon the fiber surfaces. Further, by keeping the fiber surfaces dry through the mechanism of resistance heating, chemical reactions which would corrode or erode the fiber material are prevented from occurring.

In accordance with our invention, the extra cladding 14 is characterized by a higher degree of chemical stability than is conventionally available in the optical glasses which it encloses. The previously described electronically conducting glass is suitable in this regard. Alternatively, a material is selected that will propitiously combine with the free sodium ions near the surface of the first cladding, thereby reducing their mobility and retarding adverse chemical reactions in the presence of humidity and high-voltage stresses.

Consequently the extra cladding will prevent the core 12 and the first cladding 13 of each fiber 9 from being degraded by moisture or chemicals to which the surface of the light conduit may be exposed. This stabilizing characteristic is useful per se in improving the performance of the light pipe 1, whether or not the second cladding is electronically conducting. One material well suited for this purpose is General Electric Dri-Film SC-87 silicone compound which is commercially available from the Silicone Products Dept. of General Electric in Waterford, N.Y. By dipping the optical fibers in a diluted solution of this material and then air drying, a thin, transparent film of water repellent silicone will tightly adhere to the fibers, thereby forming the highly stable extra cladding 14 which completely surrounds the first cladding 13 of the individual glass fibers 9 comprising the light pipe 1.

As will be evident from the foregoing description—certain aspects of the invention are not limited to the particular details of the construction of examples illustrated, and it is contemplated that various other modifications or applications will occur to those skilled in the art. It is therefore intended that the appended claims shall cover such modifications and applications as do not depart from the true spirit and scope of the invention.

What is claimed as new and desired to be secured by Letters Patent of the United States is:

1. In a radiant energy transmitting conduit whose opposite ends are at substantially different electric potentials, means comprising a flexible cladding of electronically-conducting glass for covering the surface of said conduit along the whole length thereof and for providing a path for electric current between said opposite ends to support resistance heating of said glass in order to prevent the accomulation of moisture thereon.

2. In a radiant energy transmitting conduit whose opposite ends are at substantially different electric potentials, a flexible cladding of electronically-conducting glass applied to said conduit continuously between said opposite ends, the electronic conduction of said glass being at least 100 times greater than its ionic conduction to prevent the formation along the conduit of localized potential gradients of such high magnitude as to cause an electrical discharge.

3. In a system comprising a light-sensitive element, a source of light, and a light pipe extending therebetween, said light pipe including a plurality of parallel optical fibers each comprising a core and a first cladding, the improvement wherein second cladding is applied to said fibers surrounding said first cladding along the whole length of the light pipe from said source to said element, said second cladding comprising a thin, flexible film of water repellent material having a higher degree of chemical stability than said first cladding.

4. The system set forth in claim 3 wherein said second cladding further comprises electronically-conducting material.

5. For transmitting radiant energy, a plurality of separate flexible conduits disposed in parallel relationship with each other, each of said conduits comprising an elongated core of radiant energy conducting material, a first cladding cooperating with said core so that radiant energy entering one end of said core will be transmitted by a series of internal reflections to the other end thereof, and a second discrete cladding tightly covering said first cladding continuously between the opposite ends of the conduit, said second cladding, compared to said first cladding, having a higher degree of chemical stability and greater resistance to attack by moisture.

6. The subject matter of claim 5 in which said second cladding is transparent.

7. The subject matter of claim 5 in which each conduit extends for an appreciable distance between its opposite ends which are respectively adapted to be subjected to substantially different electric potentials.

* * * * *